United States Patent
Suciu et al.

(10) Patent No.: US 9,347,374 B2
(45) Date of Patent: May 24, 2016

(54) GAS TURBINE ENGINE BUFFER COOLING SYSTEM

(75) Inventors: Gabriel L. Suciu, Glastonbury, CT (US); Ioannis Alvanos, West Springfield, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1006 days.

(21) Appl. No.: 13/405,514

(22) Filed: Feb. 27, 2012

(65) Prior Publication Data

US 2013/0219919 A1 Aug. 29, 2013

(51) Int. Cl.
- *F02C 6/08* (2006.01)
- *F01D 5/08* (2006.01)
- *F01D 9/06* (2006.01)
- *F02C 7/18* (2006.01)

(52) U.S. Cl.
CPC . *F02C 6/08* (2013.01); *F01D 5/081* (2013.01); *F01D 9/065* (2013.01); *F02C 7/185* (2013.01); *F02C 7/18* (2013.01); *F05B 2260/205* (2013.01); *Y02T 50/676* (2013.01)

(58) Field of Classification Search
CPC .............. F02C 7/18; F02C 7/185; F02C 6/08; Y02T 50/676; F05B 2260/205; F01D 5/081; F01D 9/065
USPC ................ 60/785, 795, 806, 728, 266, 39.08
See application file for complete search history.

(56) References Cited

U.S. PATENT DOCUMENTS

| | | | |
|---|---|---|---|
| 4,321,007 A * | 3/1982 | Dennison et al. | 415/142 |
| 4,526,511 A * | 7/1985 | Levine | 416/95 |
| 4,561,246 A | 12/1985 | Hovan | |
| 4,574,584 A | 3/1986 | Hovan | |
| 4,709,545 A | 12/1987 | Stevens et al. | |
| 4,822,244 A | 4/1989 | Maier et al. | |
| 4,872,810 A * | 10/1989 | Brown et al. | 416/145 |
| 4,979,872 A * | 12/1990 | Myers et al. | 415/142 |
| 5,178,202 A | 1/1993 | Dannoura et al. | |
| 5,273,397 A * | 12/1993 | Czachor et al. | 415/177 |
| 5,292,227 A * | 3/1994 | Czachor et al. | 415/209.3 |
| 5,310,319 A * | 5/1994 | Grant et al. | 416/220 R |
| 5,392,614 A | 2/1995 | Coffinberry | |
| 5,402,636 A | 4/1995 | Mize et al. | |

(Continued)

FOREIGN PATENT DOCUMENTS

| | | |
|---|---|---|
| EP | 0570217 B1 | 10/1997 |
| EP | 0608142 B1 | 10/1999 |
| EP | 2374995 A2 | 10/2011 |

OTHER PUBLICATIONS

Intellectual Property Office of Singapore Written Opinion for Singapore Application No. 11201404760Y, dated Jan. 14, 2015.

(Continued)

*Primary Examiner* — Phutthiwat Wongwian
*Assistant Examiner* — Michael B Mantyla
(74) *Attorney, Agent, or Firm* — Carlson, Gaskey & Olds

(57) ABSTRACT

A gas turbine engine includes a heat exchanger, a mid-turbine frame, a passageway that extends through at least a portion of the mid-turbine frame and a first nozzle assembly. The heat exchanger exchanges heat with a bleed airflow to provide a conditioned airflow. The mid-turbine frame is in fluid communication with the heat exchanger. The conditioned airflow is communicated through the passageway and is received by the first nozzle assembly to condition gas turbine engine hardware.

17 Claims, 4 Drawing Sheets

(56) References Cited

U.S. PATENT DOCUMENTS

| | | | |
|---|---|---|---|
| 5,581,996 A * | 12/1996 | Koch et al. | 60/782 |
| 5,597,167 A * | 1/1997 | Snyder et al. | 277/355 |
| 5,611,197 A | 3/1997 | Bunker | |
| 5,645,397 A * | 7/1997 | Soechting et al. | 415/115 |
| 5,782,076 A | 7/1998 | Huber et al. | |
| 5,918,458 A * | 7/1999 | Coffinberry et al. | 60/785 |
| 6,050,079 A | 4/2000 | Durgin et al. | |
| 6,098,395 A | 8/2000 | North | |
| 6,124,646 A | 9/2000 | Artinian et al. | |
| 6,183,193 B1 | 2/2001 | Glasspoole et al. | |
| 6,250,061 B1 | 6/2001 | Orlando | |
| 6,267,553 B1 | 7/2001 | Burge | |
| 6,468,032 B2 | 10/2002 | Patel | |
| 7,000,404 B2 | 2/2006 | Palmisano et al. | |
| 7,114,339 B2 | 10/2006 | Alvanos et al. | |
| 7,562,519 B1 | 7/2009 | Harris et al. | |
| 7,823,389 B2 | 11/2010 | Seitzer et al. | |
| 8,056,345 B2 | 11/2011 | Norris et al. | |
| 8,061,969 B2 | 11/2011 | Durocher et al. | |
| 8,459,040 B2 | 6/2013 | Glahn et al. | |
| 8,683,811 B2 | 4/2014 | Clemen et al. | |
| 2002/0076318 A1* | 6/2002 | Patel | 415/115 |
| 2002/0148213 A1 | 10/2002 | Yu | |
| 2004/0148943 A1* | 8/2004 | Laurello et al. | 60/782 |
| 2005/0095118 A1* | 5/2005 | Liang | 415/115 |
| 2005/0111964 A1 | 5/2005 | Krammer et al. | |
| 2005/0281667 A1* | 12/2005 | Liang | 415/115 |
| 2006/0285968 A1 | 12/2006 | Riahi et al. | |
| 2008/0041064 A1 | 2/2008 | Moore et al. | |
| 2008/0112795 A1* | 5/2008 | Lee et al. | 415/115 |
| 2008/0112798 A1 | 5/2008 | Seitzer et al. | |
| 2008/0141678 A1 | 6/2008 | Brunet et al. | |
| 2008/0232953 A1* | 9/2008 | Guimbard et al. | 415/110 |
| 2008/0310955 A1 | 12/2008 | Norris et al. | |
| 2009/0010751 A1 | 1/2009 | McCaffrey et al. | |
| 2009/0019858 A1 | 1/2009 | Roberge | |
| 2009/0044543 A1 | 2/2009 | Clemen et al. | |
| 2009/0148271 A1* | 6/2009 | Alvanos et al. | 415/142 |
| 2010/0132370 A1 | 6/2010 | Durocher et al. | |
| 2010/0175387 A1 | 7/2010 | Foust et al. | |
| 2010/0275572 A1* | 11/2010 | Durocher et al. | 60/39.08 |
| 2010/0275612 A1 | 11/2010 | Smoke et al. | |
| 2010/0300113 A1 | 12/2010 | Grewal et al. | |
| 2011/0030386 A1 | 2/2011 | Kumar et al. | |
| 2011/0072832 A1 | 3/2011 | Blanchard et al. | |
| 2011/0079019 A1 | 4/2011 | Durocher et al. | |
| 2011/0088405 A1 | 4/2011 | Turco | |
| 2011/0126543 A1 | 6/2011 | Kirsopp et al. | |
| 2011/0247344 A1 | 10/2011 | Glahn et al. | |
| 2011/0271689 A1 | 11/2011 | Lacy et al. | |

OTHER PUBLICATIONS

International Preliminary Report on Patentability for International application No. PCT/US2013/026766 dated Sep. 12, 2014.
International Preliminary Report on Patentability for International application No. PCT/US2013/025507 dated Sep. 12, 2014.
International Preliminary Report on Patentability for International application No. PCT/US2013/025506 dated Sep. 12, 2014.
International Preliminary Report on Patentability for International application No. PCT/US2013/026767 dated Sep. 12, 2014.
International Search Report and Written Opinion of the International Search Authority for International application No. PCT/US2013/025507 dated Jun. 2, 2013.
International Search Report and Written Opinion of the International Search Authority for International application No. PCT/US2013/025506 dated May 24, 2013.
International Search Report and Written Opinion of the International Search Authority for International application No. PCT/US2013/026766 dated May 29, 2013.
International Search Report and Written Opinion of the International Search Authority for International application No. PCT/US2013/026767 dated Jun. 4, 2013.
Intellectual Property Office of Singapore, Search Report and Written Opinion for Singapore Patent Application No. 1120140270R dated Jul. 9, 2015.
European Search Report for Application No. 13754271.8 dated Oct. 15, 2015.
Singapore Search Report and Written Opinion for Singapore Application No. 11201404676S, received Jan. 13, 2016.

\* cited by examiner

GAS TURBINE ENGINE BUFFER COOLING SYSTEM

BACKGROUND

This disclosure relates to a gas turbine engine, and more particularly to a buffer cooling system that can condition portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads.

Gas turbine engines channel airflow through the core engine components along a primary gas path. The airflow communicated along the primary gas path is typically of a relatively high operating temperature. The material properties of gas turbine engine hardware can limit the ability to operate the gas turbine engine utilizing cycles which require higher temperatures.

SUMMARY

A gas turbine engine includes a heat exchanger, a mid-turbine frame, a passageway that extends through at least a portion of the mid-turbine frame and a first nozzle assembly. The heat exchanger exchanges heat with a bleed airflow to provide a conditioned airflow. The mid-turbine frame is in fluid communication with the heat exchanger. The conditioned airflow is communicated through the passageway and is received by the first nozzle assembly to condition gas turbine engine hardware.

In a further embodiment of the foregoing gas turbine engine embodiment, the first nozzle assembly can include a tangential onboard injection (TOBI) nozzle.

In a further embodiment of either of the foregoing gas turbine engine embodiments, a rotor assembly can be conditioned by the conditioned airflow from the first nozzle assembly.

In a further embodiment of any of the foregoing gas turbine engine embodiments, a rotor assembly that can be positioned upstream from the first nozzle assembly is conditioned by the conditioned airflow from the first nozzle assembly.

In a further embodiment of any of the foregoing gas turbine engine embodiments, the passageway can include tubing.

In a further embodiment of any of the foregoing gas turbine engine embodiments, the bleed airflow can be communicated from a compressor section of the gas turbine engine.

In a further embodiment of any of the foregoing gas turbine engine embodiments, the heat exchanger can exchange heat between the bleed airflow and a fan airflow to render the conditioned airflow.

In a further embodiment of any of the foregoing gas turbine engine embodiments, a bearing compartment can be positioned radially inwardly from the mid-turbine frame between the passageway and the first nozzle assembly.

In a further embodiment of any of the foregoing gas turbine engine embodiments, the first nozzle assembly can communicate the conditioned airflow between a seal and a disk to condition the gas turbine engine hardware.

In a further embodiment of any of the foregoing gas turbine engine embodiments, the passageway can include an opening and the conditioned airflow can be communicated through the opening to the first nozzle assembly.

In a further embodiment of any of the foregoing gas turbine engine embodiments, the first nozzle assembly can be connected to a radially inner casing of the mid-turbine frame to establish a cavity.

In a further embodiment of any of the foregoing gas turbine engine embodiments, the conditioned airflow can be communicated to a high pressure turbine through one of the first nozzle assembly and a second nozzle assembly and to a low pressure turbine through the other of the first nozzle assembly and the second nozzle assembly.

In another exemplary embodiment, a method of conditioning a portion of a gas turbine engine includes removing heat from a bleed airflow to render a conditioned airflow, communicating the conditioned airflow through a passageway disposed at least partially through a mid-turbine frame of the gas turbine engine, and feeding the conditioned airflow through a nozzle assembly to one of an upstream location and a downstream location of the gas turbine engine.

In a further embodiment of the foregoing method embodiment, the method includes the step of cooling a rotor assembly of the gas turbine engine with the conditioned airflow.

In a further embodiment of either of the foregoing method embodiments, the step of communicating the conditioned airflow includes communicating the conditioned airflow from a heat exchanger, through the passageway of the mid-turbine frame, and then through the nozzle assembly.

In a further embodiment of any of the foregoing method embodiments, the step of feeding the conditioned airflow includes feeding the conditioned airflow through a cavity, then through the nozzle assembly, and then onboard of a rotor assembly of a lower pressure turbine of the gas turbine engine.

In a further embodiment of any of the foregoing method embodiments, the step of feeding the conditioned airflow includes feeding the conditioned airflow through a bearing compartment, then through the nozzle assembly, and then onboard of a rotor assembly of a high pressure turbine of the gas turbine engine.

In yet another exemplary embodiment, a gas turbine engine includes a high pressure turbine, a low pressure turbine downstream from the high pressure turbine, a mid-turbine frame positioned axially between the high pressure turbine and the low pressure turbine, a bearing compartment and a buffer cooling system. The mid-turbine frame includes at least one strut that extends radially between an outer casing and an inner casing of the mid-turbine frame. The bearing compartment is positioned radially inward from the inner casing of the mid-turbine frame. The buffer cooling system includes a heat exchanger, a passageway that extends between the outer casing and the bearing compartment, and a nozzle assembly in fluid communication with the passageway to receive a conditioned airflow rendered by the heat exchanger to condition hardware of at least one of the high pressure turbine and the low pressure turbine.

The various features and advantages of this disclosure will become apparent to those skilled in the art from the following detailed description. The drawings that accompany the detailed description can be briefly described as follows.

DETAILED DESCRIPTION

Figure 1:
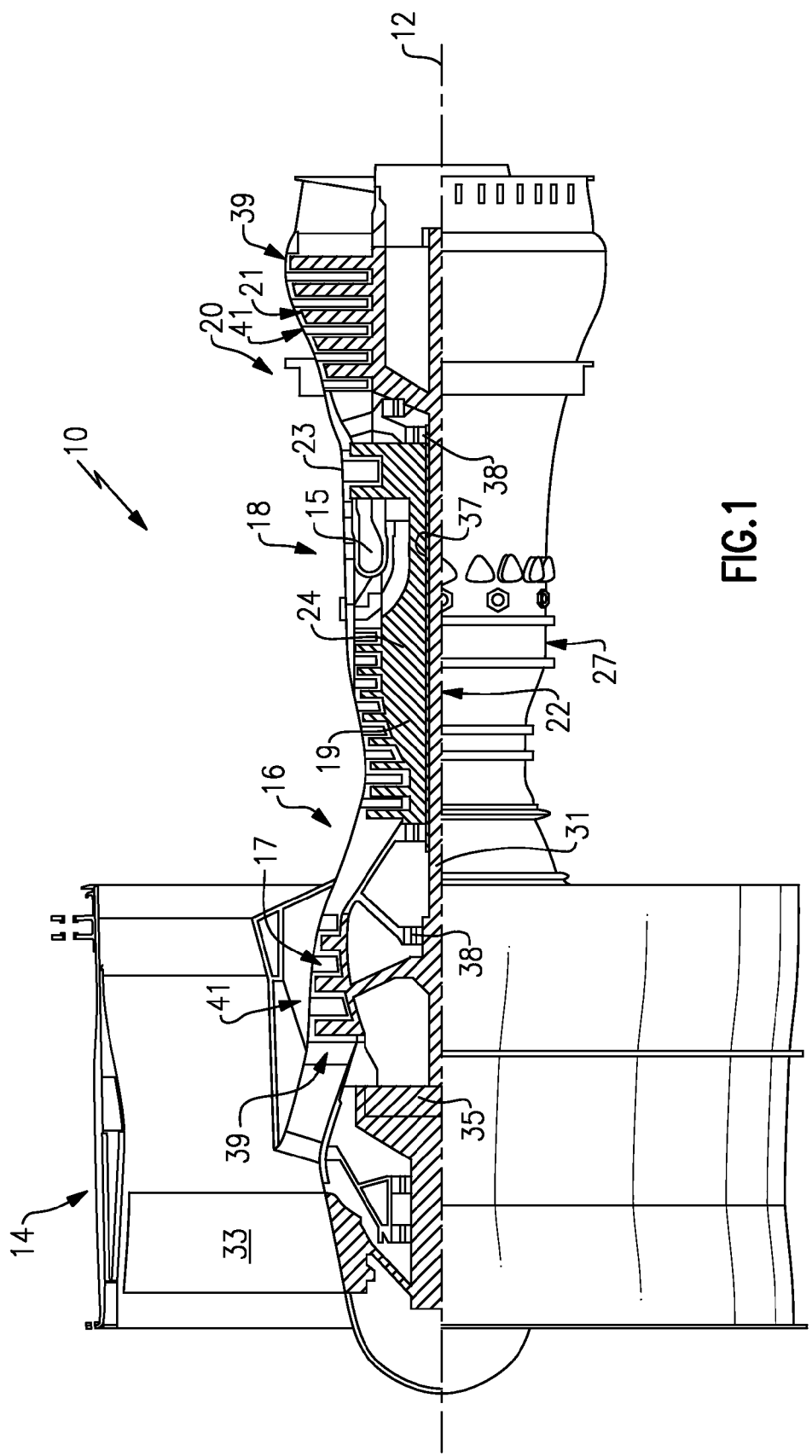
FIG. 1 schematically illustrates a cross-sectional view of a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines could include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20. This view is highly schematic and is included to provide a basic understanding of the gas turbine engine 10 and not to limit the disclosure. This disclosure extends to all types of gas turbine engines and to all types of applications, including but not limited to, three spool turbofan configurations.

The exemplary gas turbine engine 10 of FIG. 1 generally includes at least a low speed spool 22 and a high speed spool 24 mounted for rotation about an engine centerline axis 12 relative to an engine static structure 27 via several bearing systems 38. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be positioned elsewhere within the gas turbine engine 10. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of vanes. The blades of the rotor assemblies 39 create or extract energy (in the form of pressure) from the airflow that is communicated through the gas turbine engine 10. The vanes of the vane assemblies 41 direct airflow to the blades of adjacent rotor assemblies 39 to either add or extract energy.

It should be understood that various bearing systems 38 could be positioned at alternative or additional locations of the gas turbine engine 10. The bearing systems 38, along with other gas turbine engine structures and systems, define internal compartments that can be pressurized. As discussed in greater detail below, the bearing systems 38 can be used to communicate a conditioned airflow to various hardware of the gas turbine engine 10 that require conditioning in order to withstand the relatively high operating temperatures of the gas turbine engine 10.

Figure 2:
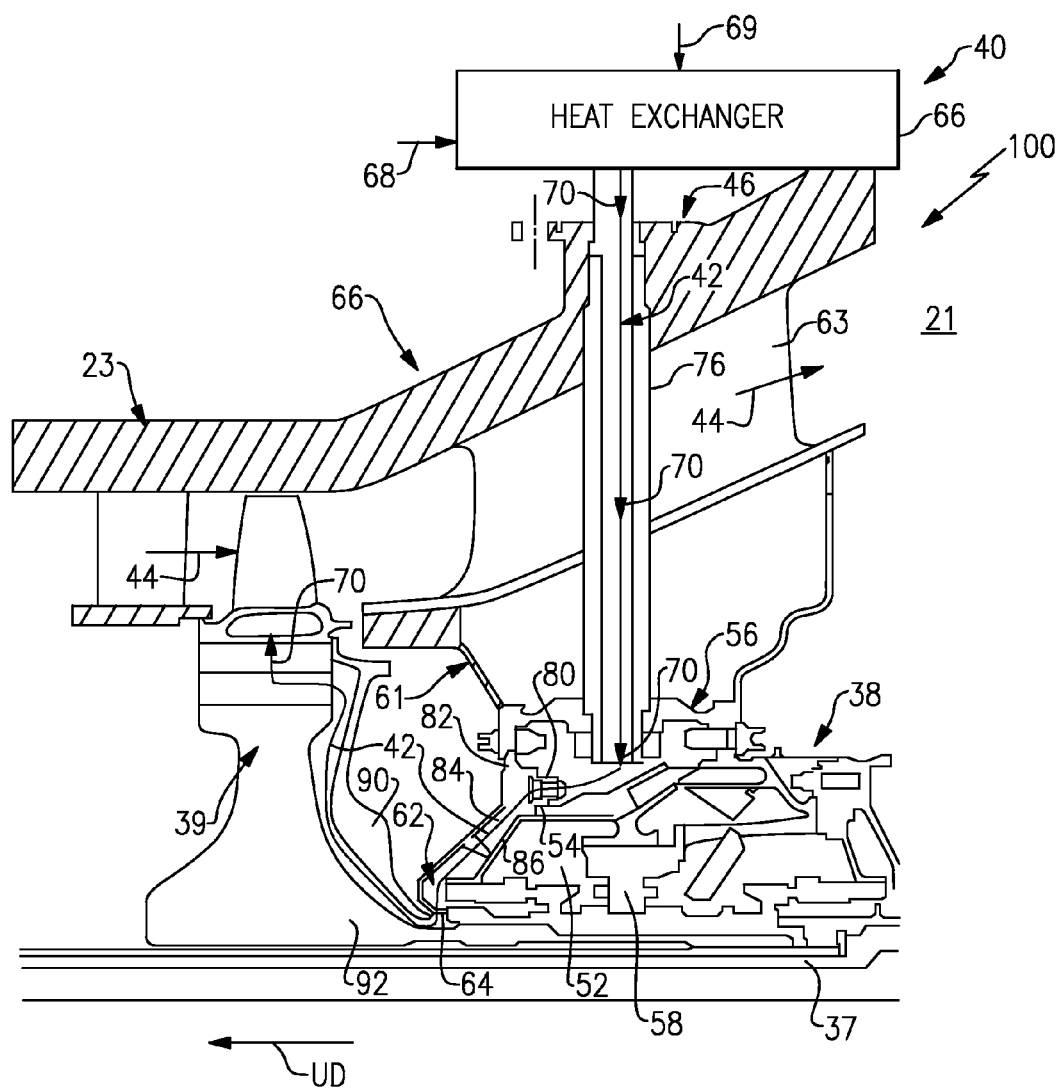
FIG. 2 illustrates a buffer cooling system that can be incorporated into a gas turbine engine.

FIG. 2 illustrates a portion 100 of a gas turbine engine, such as the gas turbine engine 10. In this example, the portion 100 encompasses portions of the high pressure turbine 23, the low pressure turbine 21 and a mid-turbine frame 46 that is positioned axially between the high pressure turbine 23 and the low pressure turbine 21. It should be understood that this disclosure could extend to other portions of a gas turbine engine beyond what is shown by FIG. 2.

The mid-turbine frame 46 supports a bearing system 38 that can be positioned radially inwardly from the mid-turbine frame 46. The mid-turbine frame 46 transfers bearing loads from the bearing system 38 to an outer engine casing. In other words, the mid-turbine frame 46 is a load bearing structure.

The mid-turbine frame 46 includes an outer casing 60, an inner casing 61 and a plurality of struts 63 that extend between the outer casing 60 and the inner casing 61. Although a single strut 63 is shown in FIG. 2, it should be understood that a plurality of struts 63 could be circumferentially disposed about the engine centerline axis 12. Bearing loads from the bearing system 38 can be communicated through the struts 63 to the outer casing 60, which can be either a separate structure from the outer engine casing or can be incorporated therewith.

A bearing compartment 52 is associated with the bearing system 38. A bearing housing 54 extends circumferentially about the outer shaft 37 to house a bearing 58 within the bearing compartment 52. The bearing housing 54 circumferentially surrounds the bearing 58 to protect the bearing 58 and to confine lubricant inside the bearing compartment 52. An outer wall 56 of the bearing housing 54 is connected to the inner casing 61 of the mid-turbine frame 46.

A buffer cooling system 40 establishes a buffer cooling air path 42 for the communication of a conditioned airflow 70 through the portion 100 of the gas turbine engine 10. In this disclosure, the term "conditioned airflow" includes both cooled and heated airflows.

The buffer cooling system 40 includes a heat exchanger 66, a nozzle assembly 62 that is fed with a conditioned airflow 70 received from the heat exchanger 66, and a passageway 76 that extends at least partially through the mid-turbine frame 46. The passageway 76 is in fluid communication with the heat exchanger 66 and extends radially between the heat exchanger 66 and the bearing compartment 52 to feed the conditioned airflow 70 to the nozzle assembly 62 in order to condition hardware of the gas turbine engine, such as a rotor assembly 39 of the high pressure turbine 23, the low pressure turbine 21, or both, as is further discussed below.

The passageway 76 can extend radially through a strut 63 of the mid-turbine frame 46. It should be understood that the passageway 76 is not necessarily shown to the scale it would be in practice. Rather, in the illustrated embodiment, the passageway 76 is shown enlarged to better illustrate its features. The passageway 76 provides a path for the communication of the conditioned airflow 70 to an interior of the gas turbine engine 10. In addition, other components can extend through the passageway 76, including but not limited to oil and electrical lines (not depicted).

The buffer cooling air path 42 is separate from a primary gas path 44 (for the communication of core airflow). In this example, the primary gas path 44 is communicated through the high pressure turbine 23, then through the mid-turbine frame 46 axially across the strut 63, and then through the low pressure turbine 21. The buffer cooling air path 42 extends along a route that is generally radially inward from the primary gas path 44.

Figure 3:
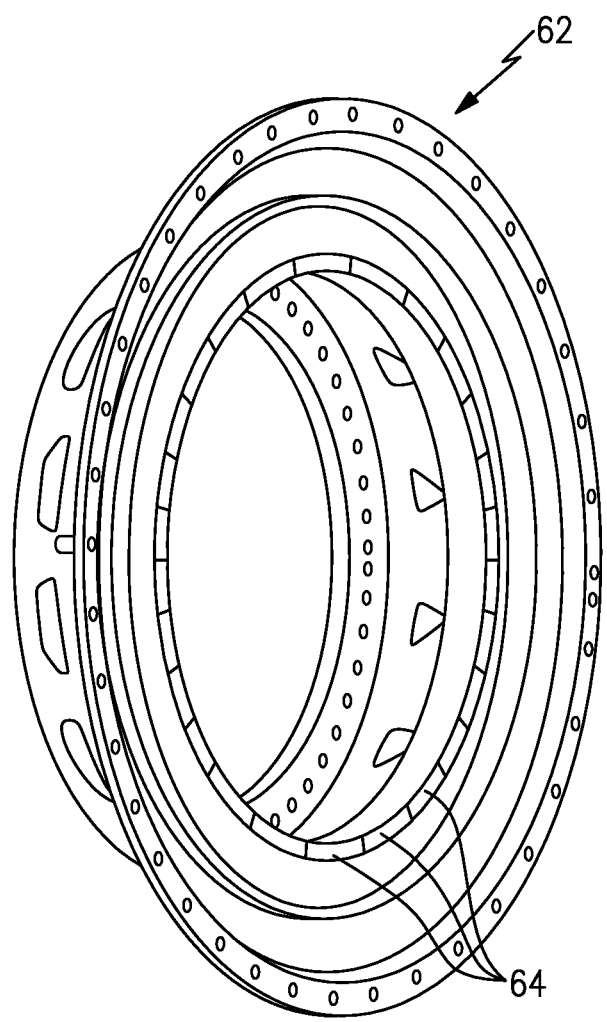
FIG. 3 illustrates an example nozzle assembly of the buffer cooling system of FIG. 2.

In the FIG. 2 embodiment, the nozzle assembly 62 communicates a conditioned airflow 70 of the buffer cooling air path 42 in an upstream direction UD toward the high pressure turbine 23 and its associated hardware. The nozzle assembly 62 can include a tangential onboard injection (TOBI) nozzle or other suitable nozzle that is capable of communicating a conditioned airflow. An example nozzle assembly 62 is illustrated in FIG. 3. The TOBI nozzle imparts a swirling movement and directs the airflow tangentially to upstream hardware, such as to the rotor assembly 39 of the high pressure turbine 23. The nozzle assembly 62 can include a plurality of openings 64 for communicating the conditioned airflow of the buffer cooling air path 42. Other nozzle assembly configurations beyond what is shown in FIG. 3 are also contemplated.

The heat exchanger 66 of the buffer cooling system 40 can be mounted at any location of the gas turbine engine 10. One example non-limiting mounting location is at the outer engine casing. The heat exchanger receives a bleed airflow 68, such as from the compressor section or some other upstream location of a gas turbine engine 10, and exchanges heat between the bleed airflow 68 and another fluid medium 69 to render a conditioned airflow 70. One example fluid medium 69 includes airflow from the fan section 14. However, the heat exchanger 66 can be any type of heat exchanger including an air/air heat exchanger, a fuel/air heat exchanger or any other heat exchanger.

The conditioned airflow 70 is communicated along the buffer cooling air path 42, which can extend from the heat exchanger 66, through the passageway 76, and then into the bearing compartment 52. The buffer cooling air path 42 can also extend through an opening 80 (or alternatively a series of opening) in a strut 82 of the bearing compartment 52 at a radially inward and upstream location of the bearing housing 54 from the passageway 76. The conditioned airflow 70 can then be communicated into a cavity 84 that is positioned between the nozzle assembly 62 and a wall 86 of the bearing housing 54. From the cavity 84, the conditioned airflow 70 can be communicated through an opening 64 (or through multiple openings) of the nozzle assembly 62 and then between a seal 90 (or other structure such as a rotating seal, a cover plate, a mini-disk etc.) and a rotor disk 92 of a rotor assembly 39 of the high pressure turbine 23. The conditioned airflow 70 can then be communicated onboard of hardware, such as the rotor assembly 39 of the high pressure turbine 23. Other hardware of the gas turbine engine 10 can additionally or alternatively be conditioned by the buffer cooling air path 42. The conditioned airflow 70 can condition the disk, rim, web and blade of the rotor assembly 39, as well as other stages, parts and components.

Figure 4:
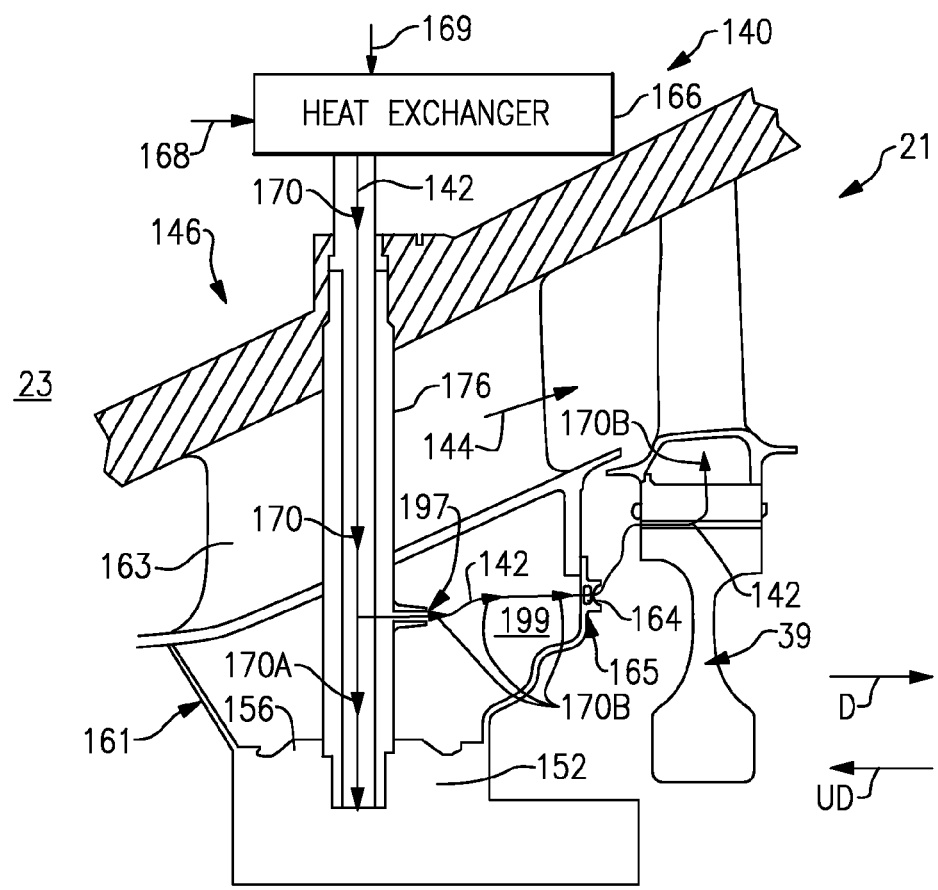
FIG. 4 illustrates another example buffer cooling system that can be incorporated into a gas turbine engine.

FIG. 4 illustrates another example buffer cooling system 140. In this example, the buffer cooling system 140 establishes a buffer cooling air path 142 for the communication of a conditioned airflow 170 to another location of a gas turbine engine 10, such as the low pressure turbine 21. The buffer cooling system 140 can include a second nozzle assembly 165 (that is separate from the nozzle assembly 62 of FIG. 2) that is fed with at least a portion 170b of the conditioned airflow 170 received from a heat exchanger 166. The buffer cooling system 140 could condition portions of the low pressure turbine 21, the high pressure turbine 23, or both. If the high pressure turbine 23 is to be conditioned in addition to the low pressure turbine 21, a portion 170a of the conditioned airflow 170 is also communicated through a bearing compartment 152 and then upstream to the hardware of the high pressure turbine 23 (similar to as depicted in FIG. 2). The buffer cooling air path 142 is separate from a primary gas path 144.

The configuration of an outer wall 156 of the bearing housing 154, an inner casing 161 of a mid-turbine frame 146 and the nozzle assembly 165 establish a cavity 199 that receives the portion 170b of the conditioned airflow 170 for communicating the portion 170b through the nozzle assembly 165. The cavity 199 acts as a plenum for feeding the portion 170b of the conditioned airflow 170 to the nozzle assembly 165. The nozzle assembly 165 can include a tangential onboard injection (TOBI) nozzle, or other suitable nozzle, that is capable of communicating a conditioned airflow.

In this example, the nozzle assembly 165 communicates the conditioned airflow 170b along the buffer cooling air path 142 in a downstream direction D toward the low pressure turbine 21 and its associated hardware. The buffer cooling air path 142 could also extend in an upstream direction UD toward the high pressure turbine 23 and its associated hardware (see FIG. 2 embodiment). It should be understood that the buffer cooling system 140 could communicate only the portion 170b of the conditioned airflow 170, or both the portions 170a and 170b.

The buffer cooling air path 142 can extend from the heat exchanger 166 through a passageway 176 which radially extends through a strut 163 of the mid-turbine frame 146. The buffer cooling air path 142 can then extend into the cavity 199 through an opening 197 of the passageway 176. From the cavity 199, the portion 170b of the conditioned airflow 170 can be communicated through one or more openings 164 in the nozzle assembly 165 onboard of hardware, such as a rotor assembly 39 of the low pressure turbine 21. The portion 170b of the conditioned airflow of the buffer cooling air path 142 can be used to condition the disk, rim, web and blade of the rotor assembly 39, as well as other stages, parts and components.

The passageway 176 can include tubing, ducting or other conduits that are capable of communicating a conditioned airflow 170 through the gas turbine engine 10. In this example, the passageway 176 extends at least partially through a strut 163 of the mid-turbine frame 46. It should be understood that the passageway 176 is not necessarily shown to the scale it would be in practice. Rather, in the illustrated embodiment, the passageway 176 is shown enlarged to better illustrate its features. The passageway 176 could be positioned at other locales besides those depicted in FIG. 4.

Although the different examples have a specific component shown in the illustrations, embodiments of this disclosure are not limited to those particular combinations. It is possible to use some of the components or features from one of the examples in combinations with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A gas turbine engine, comprising:
a heat exchanger that exchanges heat with a bleed airflow to provide a conditioned airflow;
a mid-turbine frame in fluid communication with said heat exchanger;
a passageway that extends through at least a portion of said mid-turbine frame, wherein said conditioned airflow is communicated through said passageway;
a first nozzle assembly in fluid communication with said passageway to receive said conditioned airflow to condition gas turbine engine hardware a bearing compartment positioned radially inwardly from said mid-turbine frame, wherein said bearing compartment is positioned between said passageway and said first nozzle assembly; and said conditioned airflow is communicated through said bearing compartment prior to reaching said first nozzle assembly.

2. The gas turbine engine as recited in claim 1, wherein said first nozzle assembly is a tangential onboard injection (TOBI) nozzle.

3. The gas turbine engine as recited in claim 1, comprising a rotor assembly downstream from said first nozzle assembly, wherein said rotor assembly is conditioned by said conditioned airflow from said first nozzle assembly.

4. The gas turbine engine as recited in claim 1, comprising a rotor assembly upstream from said first nozzle assembly, wherein said rotor assembly is conditioned by said conditioned airflow from said first nozzle assembly.

5. The gas turbine engine as recited in claim 1, wherein said passageway includes tubing.

6. The gas turbine engine as recited in claim 1, wherein said bleed airflow is communicated from a compressor section of the gas turbine engine.

7. The gas turbine engine as recited in claim 1, wherein said heat exchanger exchanges heat between said bleed airflow and a fan airflow to render said conditioned airflow.

8. The gas turbine engine as recited in claim 1, wherein said first nozzle assembly communicates said conditioned airflow between a seal and a disk to condition said gas turbine engine hardware.

9. The gas turbine engine as recited in claim 1, wherein said passageway includes an opening, and said conditioned airflow is communicated through said opening to said first nozzle assembly.

10. The gas turbine engine as recited in claim 1, wherein said first nozzle assembly is connected to a radially inner casing of said mid-turbine frame to establish a cavity.

11. The gas turbine engine as recited in claim 1, comprising a second nozzle assembly, wherein said conditioned airflow is communicated to a high pressure turbine through one of said first nozzle assembly and said second nozzle assembly and to a low pressure turbine through the other of said first nozzle assembly and said second nozzle assembly.

12. A gas turbine engine, comprising:
a high pressure turbine;
a low pressure turbine downstream from said high pressure turbine;
a mid-turbine frame positioned axially between said high pressure turbine and said low pressure turbine, wherein said mid-turbine frame includes at least one strut that extends radially between an outer casing and an inner casing;
a bearing compartment radially inward from said inner casing of said mid-turbine frame;
a buffer cooling system including a heat exchanger, a passageway that extends between said outer casing and said bearing compartment, a first nozzle assembly in fluid communication with said passageway to receive a first portion of a conditioned airflow rendered by said heat exchanger to condition hardware of said high pressure turbine and a second nozzle assembly in fluid communication with said passageway to receive a second portion of said conditioned airflow rendered by said heat exchanger to condition hardware of said low pressure turbine; and
said first portion of said conditioned airflow is communicated through said bearing compartment prior to reaching said first nozzle assembly.

13. The gas turbine engine as recited in claim 1, wherein said conditioned airflow is communicated through an opening of a strut of said bearing compartment.

14. The gas turbine engine as recited in claim 13, wherein said conditioned airflow is communicated through said opening and into a cavity disposed between said first nozzle assembly and a bearing housing of said bearing compartment.

15. The gas turbine engine as recited in claim 12, wherein a bearing housing of said bearing compartment, said inner casing of said mid-turbine frame and said second nozzle assembly establish a cavity configured to receive said second portion of said conditioned airflow.

16. The gas turbine engine as recited in claim 12, wherein said buffer cooling system is configured to simultaneously condition said hardware of both of said high pressure turbine and said low pressure turbine.

17. A gas turbine engine, comprising:
a heat exchanger that exchanges heat with a bleed airflow to provide a conditioned airflow;
a mid-turbine frame in fluid communication with said heat exchanger;
a passageway that extends through at least a portion of said mid-turbine frame and configured to communicate said conditioned airflow;
a first nozzle assembly in fluid communication with said passageway and configured to receive a first portion of said conditioned airflow to condition hardware of a high pressure turbine;
a second nozzle assembly in fluid communication with said passageway and configured to receive a second portion of said conditioned airflow to condition hardware of a low pressure turbine; and
said first portion of said conditioned airflow is communicated through a bearing compartment prior to reaching said first nozzle assembly.

* * * * *